United States Patent

Lee

[11] Patent Number: 5,313,351
[45] Date of Patent: May 17, 1994

[54] TWIN DISK PLAYER

[75] Inventor: Chung-Geu Lee, Suwon, Rep. of Korea

[73] Assignee: SamSung Electronics Co., Ltd., Suwon, Rep. of Korea

[21] Appl. No.: 456,860

[22] Filed: Dec. 27, 1989

[30] Foreign Application Priority Data

May 31, 1989 [KR] Rep. of Korea ............ 89-7428

[51] Int. Cl.$^5$ .............. G11B 17/04; G11B 5/012; G11B 33/02
[52] U.S. Cl. .............. 360/99.07; 360/98.01; 360/98.04; 360/99.03; 369/77.2; 369/265
[58] Field of Search .............. 360/98.01, 98.04–98.07, 360/99.02, 99.03, 99.06, 99.07; 369/32, 264, 265, 34–39, 75, 77

[56] References Cited

U.S. PATENT DOCUMENTS

| | | | |
|---|---|---|---|
| 3,913,137 | 10/1975 | Morgan | 360/98.02 |
| 4,594,700 | 6/1986 | Takahashi et al. | 369/39 |
| 4,654,737 | 3/1987 | Hopkins et al. | 360/106 |
| 4,723,185 | 2/1988 | Maeda | 360/99.07 |
| 4,742,508 | 5/1988 | Lee et al. | 360/265 |
| 4,796,251 | 1/1989 | Hirano | 369/75.2 |
| 4,816,945 | 3/1989 | Watanabe | 360/99.07 |
| 4,829,393 | 5/1989 | Shimizu et al. | 360/99.07 |

Primary Examiner—Stuart S. Levy
Assistant Examiner—Jefferson Evans
Attorney, Agent, or Firm—Robert E. Bushnell

[57] ABSTRACT

A disk player for loading and unloading a pair of disks while closing and opening a door to the disk player under control of a single motor capable of rotating in both the clockwise direction and the counterclockwise direction. During rotation in one direction of the motor a plurality of connecting gears transmit the power of the motor to a driver for the pickup, which reads the information on the disks, and to moving rack. The moving rack causes rotation of a cam gear for disengaging a disk holder and rotation of a fitting for slightly opening the door. This causes a gear rack to engage the plurality of connecting gears to thereby open the door fully so that the pair of disks can be inserted or removed from the door. After the disks are inserted in the door the motor reverses direction and pulls the door shut by reverse operation of the components used in the opening of the door.

12 Claims, 5 Drawing Sheets

FIG.5
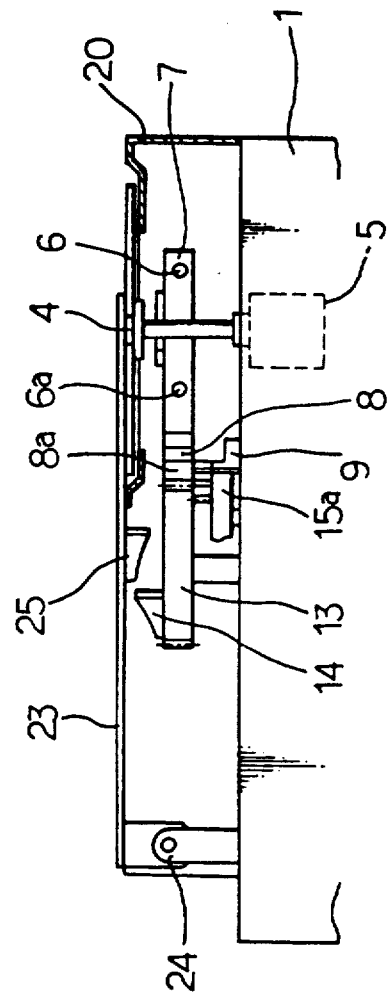
(A)
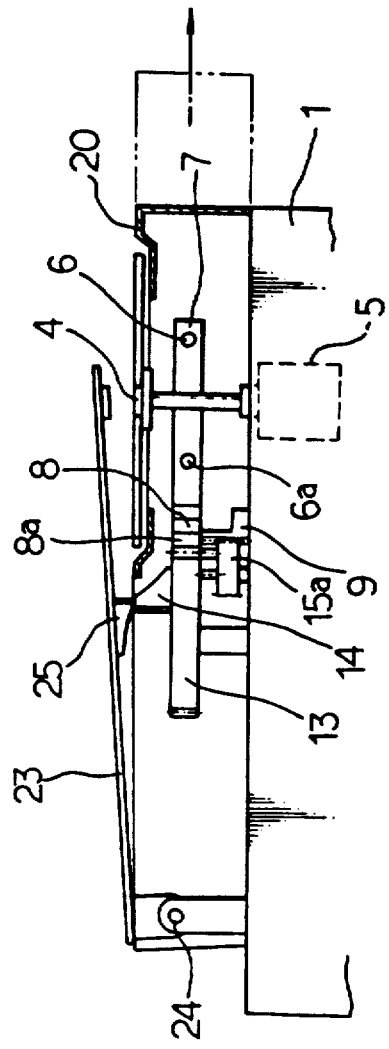
(B)

TWIN DISK PLAYER

BACKGROUND OF THE INVENTION

This invention relates to a twin disk player, and particularly to a twin disk player which enables the records of a disk to be reproduced accordingly as a disk holder and a door may be opened and shut, and simultaneously a pickup may be consecutively driven by a single driving motor mounted on a main chassis.

Generally, the records which are recorded in the disk are reproduced by loading the disk on a turn table and holding the disk by means of a disk holder, and thereafter driving the turn table and a pickup. In the turn table, a motor is used as a power source to drive the turn table. Also, a door is mounted to load the disk on the turn table and is designed to be moved in and out within the disk player when loading and unloading the disk.

However, the conventional disk player with the above mentioned configuration loads only a single disk on the turn table to reproduce the records of the disk. Recently, the customers wish to have a so called twin system in which two disks are simultaneously loaded on one disk player and each disk is selectively driven as needed. In this respect, the twin system has been partly developed to satisfy the customer's desires.

The conventional twin disk player uses a pair of turn tables, two motors for separately operating the turn tables, a motor for opening and shutting a door, and a motor for driving a pickup, wherein each of the four motors has a characteristic operation which is consecutively performed.

Each operating time of the motors should be adequately established, however, the establishment of the proper time is very difficult and additional devices are required to drive the four motors. Accordingly, the above configuration causes the disk player to be complex and the volume thereof to be large. Further, there is the problem that it is difficult to systematically drive each of said motors and to smoothly run disk player.

SUMMARY OF THE INVENTION

It is an object of the present invention to provide a twin disk player in which the driving of a disk holder, the opening and shutting of a door, and the driving of a pickup may be performed by a single driving motor, and the consecutive operations may be accurately and smoothly accomplished by simplifying the overall configuration of the disk player.

A twin disk player having a pair of turn tables and a pair of motors for driving the turn tables on a main chassis, uses: a single driving motor being able to rotate in both the clockwise and counterclockwise direction; transmitting means being engaged with a gear rotatably mounted on the shaft of the driving motor for transmitting the power of the driving motor; operating means being moved by the transmitting means; holder opening and shutting means being rotated by the movement of the operating means for moving up and down a disk holder; and door opening and shutting means for moving a door with the operating means.

BRIEF DESCRIPTION OF THE DRAWINGS

These and other objects, features, and advantages of the present invention will become more apparent from the following description for the preferred embodiment taken in conjunction with the accompanying drawings, in which:

FIG. 5(A) is a side view illustrating the state in which a disk holder is mounted on a turn table according to the present invention.

FIG. 5(B) is a side view illustrating the state in which the disk holder is detached from the turn table according to the present invention.

DESCRIPTION OF THE PREFERRED EMBODIMENT

The present invention will be now described in detail with the accompanying drawings.

Figure 1:
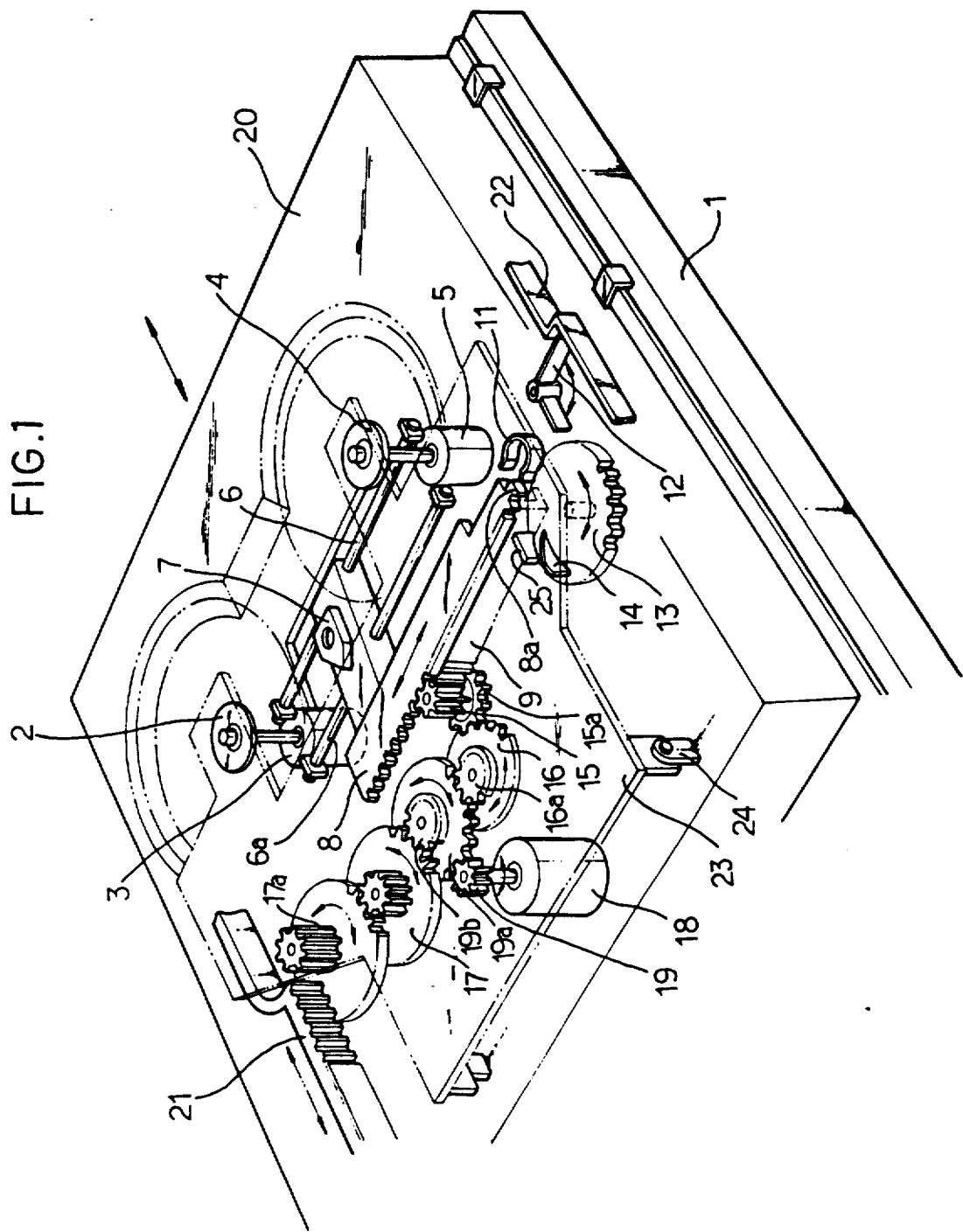
FIG. 1 is a perspective view of a twin disk player according to the present invention.

As shown in FIG. 1, each of a pair of turn tables 2 and 4 are driven by each of a pair of motors 3 and 5 mounted on a main chassis 1. A pair of guide bars 6 and 6a are mounted between the turn tables 2 and 4. A pickup 7 is rectilinearly reciprocated along the guide bars 6 and 6a to selectively operate two disks which are mounted on the turn tables 2 and 4, respectively.

Figure 2:
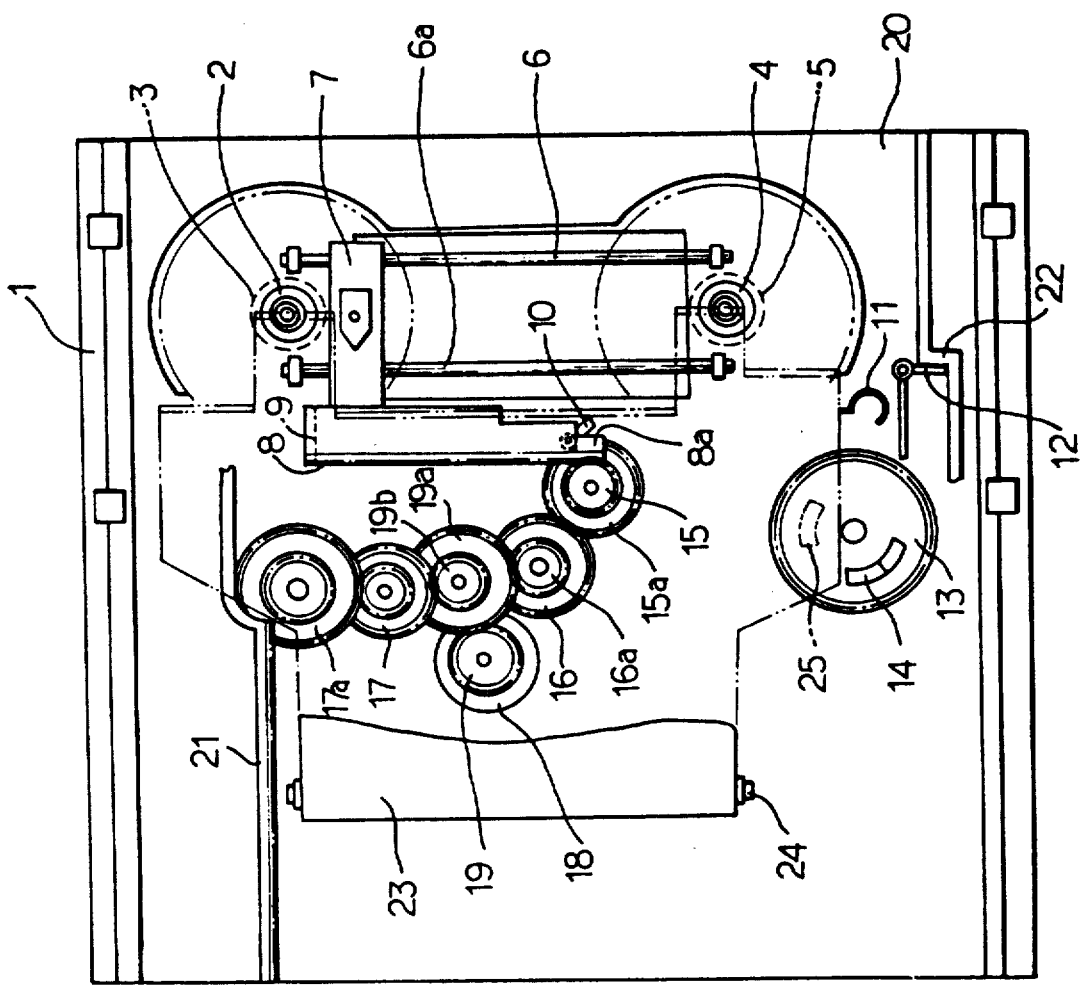
FIG. 2 is a plan view illustrating the assembled state of the twin disk player.

Further, as shown in FIG. 2, a moving rack 8 with a pushing member 8a and a driving rack 9 for driving the pickup 7 are provided at one side of the pickup 7. A lever 10 is provided in the inside of the driving rack 9 to be inserted into, or to be detached from a holder guide 11 formed at one side of the main chassis 1. A freely rotatable rotating member 12 is provided beneath the holder guide 11 to be rotated by the pushing member 8a which is formed in the moving rack 8. A cam gear 13 with a cam part 14 on the surface thereof is disposed at the left side of the rotating member 12 to be engaged with the moving rack 8.

On the other hand, a pinion gear 15 is disposed to simultaneously be engaged with both the moving rack 8 and the driving rack 9. A driving gear 19 is rotatably mounted on the shaft of a driving motor 18. A pinion gear 15a concentrically formed with the pinion gear 15 is driven via each of connecting gears 19a, 19b, 16, and 16a which is successively engaged with the driving gear 19. Connecting gears 17 and 17a are successively engaged with the connecting gear 19a which is concentrically formed with the connecting gear 19a.

Further, a door 20 is provided on the top of the main chassis 1 and an opening and shutting rack 21 is formed at one inner side face of the door 20 to be engaged with the connecting gear 17a. A fitting member 22 which is operated by the rotating member 12 is provided at the other inner side face to open and shut the door 20.

Referring to FIG. 5, a disk holder 23 is mounted on the upper portion of the door 20 to be rotated by a hinge member 24 which is disposed on the main chassis 1. A projecting member 25 is disposed in a downward direction on the disk holder 23 to raise and lower the disk holder 23 by the cam part 14 which is disposed on the cam gear 13.

The operation and effect of the present invention with the above configuration will not be explained in detail.

When an operating button (not shown) is pushed to load the disks on the turn tables 2 and 4 under the door 20 not being opened, as shown in FIG. 2, the motor 18 is driven to rotate the driving gear 19 rotatably mounted on the shaft of the motor 18. Further, the connecting gears 19a and 19b are rotated in accordance with the rotation of the driving gear 19. Sequentially, the pinion gear 15a is rotated in accordance with the rotation of the connecting gears 16a and 16b which are successively engaged with the connecting gear 19a. Also, the connecting gear 17 in mesh with the gear 19b and the connecting gear 17a in mesh with the connecting gear 17 are rotated in accordance with the rotation of the connecting gear 19b, respectively.

At this time, since the opening and shutting rack 21 is not engaged with the connecting gear 17a, the door 20 is not moved and the connecting gears 17 and 17a is idly rotated.

Figure 3:
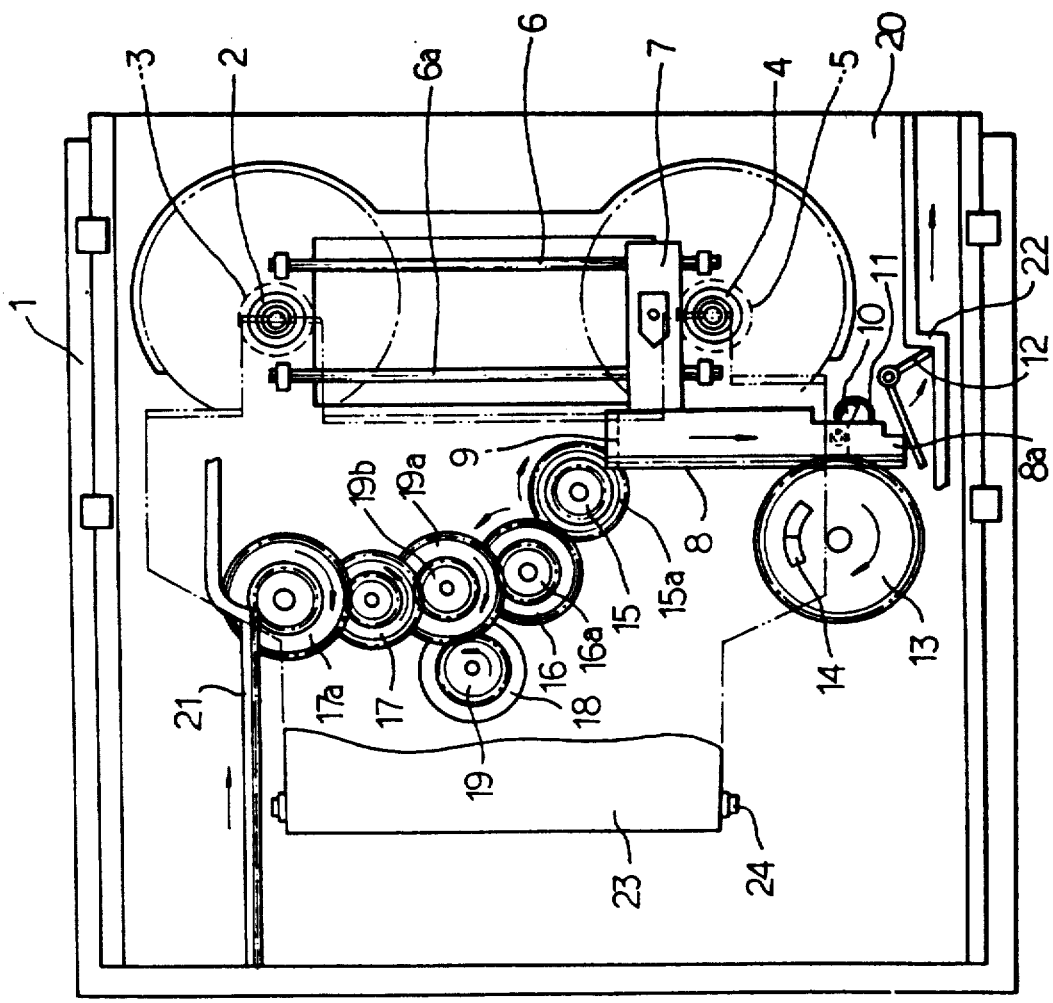
FIG. 3 is a plan view illustrating the state in which a door is just about to be opened according to the present invention.

On the other hand, when the pinion gear 15a is rotated in the clockwise direction as shown in FIG. 3, the pinion gear 15 concentrically formed with the pinion gear 15a is simultaneously engaged with both the moving rack 8 and the driving rack 9, and is rotated to move the moving rack 8 and the driving rack 9. Accordingly, the moving rack 8 for opening and shutting the door 20 and the driving rack 9 for driving the pickup 7 are moved down as shown in FIG. 3. The lever 10 formed at one side of the driving rack 9 is contacted with the holder guide 11 to be inserted into the holder guide 11 in accordance with the downward movement of the racks 8 and 9. Sequentially, the driving rack 9 is stopped and simultaneously is disengaged with the pinion gear 15. Also, the pickup 7 connected with the driving gear 9 is stopped. Further, the moving rack 8 is successively moved down to rotate the cam gear 13. At this time, the cam part 14 disposed on the top of the cam gear 13 is simultaneously rotated to push up the projecting member 25 which is disposed on the bottom of the disk holder 23.

Namely, the disk holder 23 is ascended, around the hinge 24 at one side of the disk holder 23, to move the door 20. The moving rack 8 is successively moved to push and rotate the rotating member 12 by means of the pushing member 8a formed at one side of the moving rack 8 as shown in FIG. 3.

Figure 4:
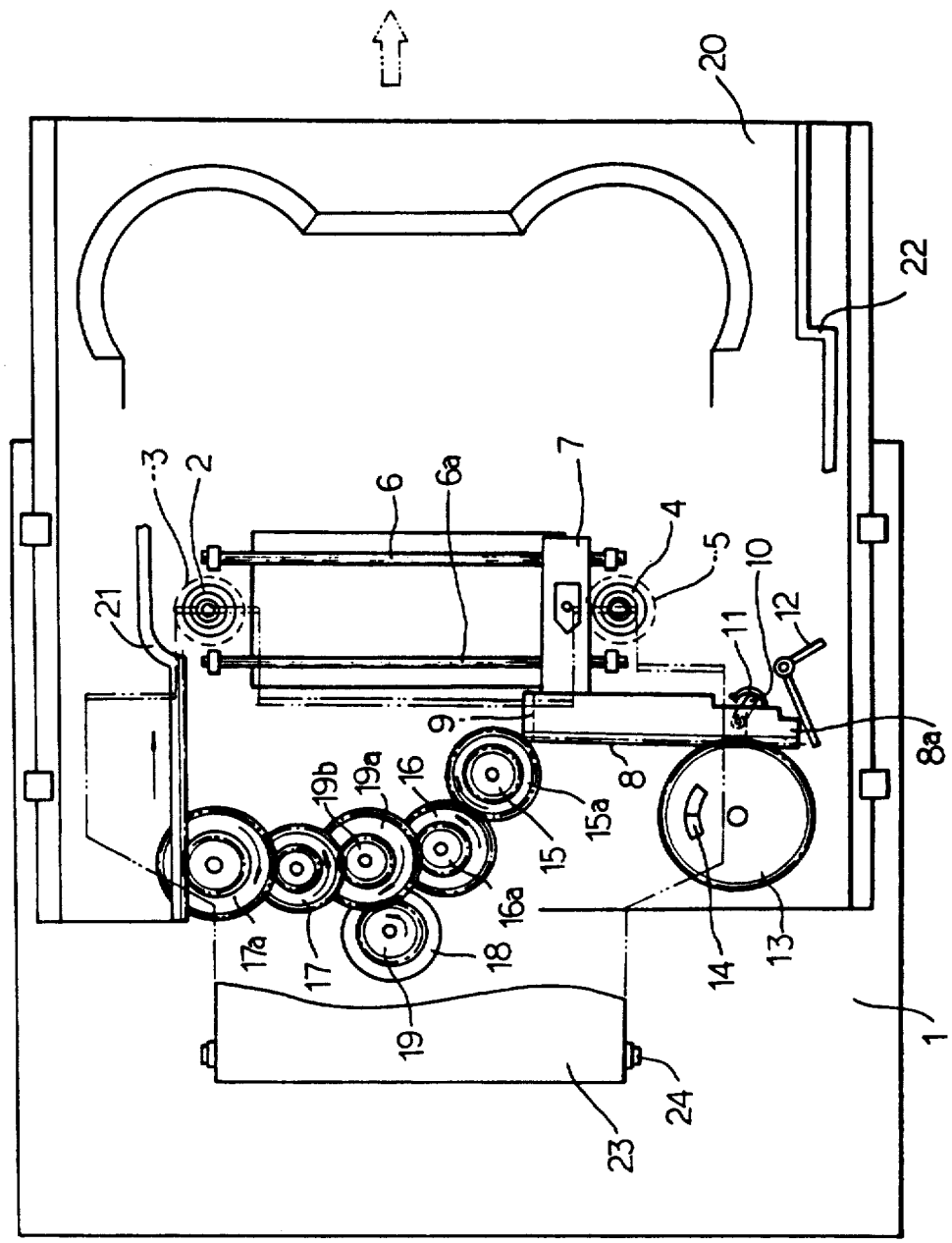
FIG. 4 is a plan view illustrating the state in which the door is opened.

The fitting member 22 which is formed at the lower part of the door 20 is pushed toward the right direction as shown in FIG. 3 according to the rotation of the rotating member 12. Consequently, the door 20 is slightly moved toward the right direction and the rack 21 of the door 20 is engaged with the connecting gear 17a being idly rotated and is moved toward the right direction to open the door 20 under the disk holder 23 being opened, as shown in FIG. 4.

Under the door 20 being opened, when two disks are inserted into the door 20, the driving motor 18 is reversely driven to reversely rotate the connecting gears, 19a, 19b, 16a and 16. Therefore, the rack 21 in mesh with the connecting gear 17a is moved toward the left direction to shut the door 20. When the door 20 is completely shut, the rack 21 of the door 20 is separated from the connecting gear 17a and is disengaged with the gear 17a to idly rotate the connecting gears 17 and 17a. At the same time, while the door 20 is moved toward the left direction, the rotating member 12 is pushed to the initial position by being again contacted with the fitting member 22. Accordingly, the racks 8 and 9 are moved to the initial position by being engaged with the pinion gear 15 which is reversely being rotated by the driving member 18.

On the other hand, the cam gear 13 engaged with the moving rack 8 is reversely rotated to separate the projecting member 25 of the disk holder 23 the cam part 14 of the cam gear 13. The disk holder 23 is again rotatably moved down around the hinge member 24 to load the disks on the turn table 2 and 4.

Further, the pickup 7 connected with the driving rack 9 is moved near to the turn table 2 by the driving motor 18, and thereafter the driving motor 18 is stopped. As above mentioned, when the disks are loaded on the turn tables, the signals are applied to the pickup 7 and the spindle motor 3 and 5 to rotate the disks. Thereafter, the motor 18 is again driven and the pickup 7 is selectively moved to reproduce the records of the disks.

At this point, although each of the connecting gears 17 and 17a is being rotated, the door 20 would not be opened since the connecting gear 17a is separated from the opening and shutting rack 21. Also, when the records of the disk is completely reproduced under the above mentioned state, the pickup is again moved to open the door 20.

As mentioned above, the disk holder and the door may be opened and shut, and the pickup may be consecutively driven by the single driving motor according to the present invention. Therefore, each operation may be smoothly performed to surely and smoothly accomplish the loading and disloading of the disk, and the reproducing of the records.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A twin disk player having a pair of turn tables and a pair of motors for driving the turntables on a main chassis, comprising:
    a single driving motor being able to rotate in both the clockwise and counterclockwise direction;
    transmitting means being engaged with a gear rotatably mounted on a shaft of said driving motor for transmitting the power of said driving motor;
    operating means being moved by said transmitting means, for applying force on a disk holder raising and lowering means in dependence upon said movement;
    said disk holder raising and lowering means being rotated by the force applied by said operating means, for raising and lowering a disk holder adapted to load a plurality of disks on the turntables;
    door opening and shutting means for moving a door between a door open state wherein the plurality of disks are loaded into the disk player and a door closed state to allow a pair of disks to be loaded onto the turntables, in response to the movement by said operating means, and
    said operating means comprising a moving rack for driving the disk holder raising and lowering means and said door opening and shutting means, and a driving rack being moved together with said moving rack for selectively driving a reproduction pickup.

2. A twin disk player as claimed in claim 1, wherein said disk holder raising and lowering means has an inclined cam part on a cam gear disposed to be rotated by said moving rack.

3. A twin disk player as claimed in claim 1, wherein said door opening and shutting means includes a fitting member formed at one side of the door to slightly be moved by a rotating member which is disposed to be rotated by the movement of said moving rack, and an opening and shutting rack for moving the door by the movement of the fitting member.

4. A twin disk player having a opening and closing door for mounting a pair of disks thereon, comprising:
- a pair of turn tables for rotating said pair of disks when said door is closed, each of said turn tables having a corresponding drive motor;
- a reversible driving motor for rotating a driving gear for controlling the opening and closing of said door;
- a first plurality of connecting gears responsive to said driving gear for rotating a pinion gear;
- said pinion gear for moving a moving rack and a driving rack;
- said driving rack for moving a reproduction pickup a first predetermined distance;
- said moving rack for engaging and rotating a cam gear means for raising a disk holder when said motor is controlling the opening of said door and lowers said disk holder when said reversible driving motor is controlling the closing of said door, said pinion gear moving rack a second predetermined distance;
- pushing means connected to said moving rack for rotating a rotating means for pushing a fitting means connected to said door for slightly opening said door; and
- an opening/shutting rack mounted to said door for engaging a second plurality of connecting gears for fully opening or closing said door, said second plurality of connecting gears being connected to said first plurality of connecting gears.

5. The twin disk player as claimed in claim 4, wherein said second plurality of connecting gears idly rotate until said rotating means slightly opens said door.

6. The twin disk player as claimed in claim 4 wherein said cam gear means comprises:
- a cam gear for engaging said moving rack; and
- a gam part mounted on said cam gear for raising or lowering said disk holder.

7. A twin disk player comprising:
- a pair of turntables each having a respective drive motor;
- a single reversible driving motor;
- a reproduction pickup;
- a disk holder and a disk holder raising and lowering means;
- a door and a door opening and shutting means; and
- means responsive to the reversible driving motor for controlling the reproduction pickup, the disk holder raising and lowering means and the door opening and shutting means, said means responsive to the reversible driving motor comprising a pair of racks for movement together, one of said pair of racks for driving said disk holder raising and lowering means and the other of said pair of racks for driving said reproduction pickup for disks on the turntables.

8. The twin disk player as claimed in claim 7, wherein said disk holder raising and lowering means is rotatably controlled to raise and lower said disk holder.

9. The twin disk player as claimed in claim 7, wherein said disk holder raising and lowering means comprises a cam gear and a cam follower.

10. The twin disk player as claimed in claim 7 wherein said means responsive to said reversible driving motor comprises a rotatable means for slightly moving said door towards an open position, the twin disk player further comprising a rack connected to the door which moves into driving engagement with the means responsive to the reversible driving motor when said door makes said slight movement toward the open position.

11. The twin disc player as claimed in claim 7, wherein said means responsive to said reversible driving motor comprises:
- a driving gear mounted on a shaft of said reversible driving motor;
- a first plurality of connecting gears responsive to said driving gear for rotating a pinion gear;
- said pinion gear for moving a moving rack and a driving rack;
- said driving rack for moving said reproduction pickup a first predetermined distance;
- said moving rack engaging and rotating a cam gear means of said disk holder raising and lowering means for raising said disk holder when said reversible driving motor is controlling the opening of said door and lowering said disk holder when said reversible driving motor is controlling the closing of said door, said pinion gear moving said moving rack a second predetermined distance;
- a pushing means connected to said moving rack for rotating a rotating means for pushing a fitting means of said door opening and shutting means which is connected to said door for slightly opening said door; and
- a second plurality of connecting gears for engaging an opening/shutting rack of said door opening and shutting means mounted to said door and for fully opening or closing said door, said second plurality of connecting gears being connected to said first plurality of connecting gears.

12. A twin disk player having a pair of turn tables and a pair of motors for driving the turntables on a main chassis, comprising:
- a reproduction pickup for reading data on a disk;
- a rack for driving said reproduction pickup;
- a single driving motor being able to rotate in both the clockwise and counterclockwise direction;
- transmitting means being engaged with a gear rotatably mounted on a shaft of said driving motor for transmitting the power of said driving motor;
- operating means being moved by said transmitting means for driving said reproduction pickup and for applying force on a disk holder raising and lowering means in dependence upon said movement;
- said disk holder raising and lowering means being rotated by the movement of said operating means, for raising and lowering a disk holder adapted to load a plurality of disks on the turntables;
- door opening and shutting means for moving a door between a door open state wherein the plurality of disks are loaded into the disk player and a door closed state to allow a pair of disks to be loaded onto the turntables, in response to the movement by said operating means, and said operating means comprising a moving rack for driving the disk holder raising and lowering means and said door opening and shutting means, and a driving rack being moved together with said moving rack for selectively driving said reproduction pickup.

* * * * *

UNITED STATES PATENT AND TRADEMARK OFFICE
CERTIFICATE OF CORRECTION

PATENT NO. : 5,313,351
DATED : May 17, 1994
INVENTOR(S) : Chung- Geu Lee

It is certified that error appears in the above-indentified patent and that said Letters Patent is hereby corrected as shown below:

Column 2,

Line 51,    Change "19a", to ---19b---:

Signed and Sealed this

First Day of October, 1996

Attest:

BRUCE LEHMAN

*Attesting Officer*    *Commissioner of Patents and Trademarks*